Feb. 2, 1943.   C. V. LITTON   2,309,966
VELOCITY MODULATED ELECTRICAL DISCHARGE TUBE
Filed July 13, 1940

INVENTOR.
CHARLES V. LITTON
BY
ATTORNEY.

Patented Feb. 2, 1943

2,309,966

UNITED STATES PATENT OFFICE

2,309,966

VELOCITY MODULATED ELECTRICAL DISCHARGE TUBE

Charles V. Litton, Redwood City, Calif., assignor to International Standard Electric Corporation, New York, N. Y., a corporation of Delaware Application July 13, 1940, Serial No. 345,281

13 Claims. (Cl. 250—27.5)

This invention relates to electrical discharge tubes and particularly to those of the velocity modulation type.

High frequency electrical discharge tubes of the velocity modulation type comprising built-in resonant circuits are known wherein a stream of electrons is modified in velocity at one point and the modified velocity electron stream is allowed to traverse a given distance until the change in velocity has caused a grouping of the electrons in the stream. Then the bunched electrons pass a resonant circuit in which energy is absorbed from the bunched electrons. Such tubes have been used as high frequency oscillation generators and amplifiers of high frequency energy.

It is an object of the present invention to provide an improved form of velocity modulation type vacuum tube which has means whereby the tuning of the tube to a desired ultra high frequency may be quickly and easily accomplished.

Another object in an invention is the provision of the tube of the above-mentioned type of simple and inexpensive means for determining when the tube is in a state of oscillation.

Still another object of the invention is the provision in a velocity modulation tube of the above mentioned type of a completely enclosed protective housing.

A further object of the invention is the provision of a tube of the character described wherein a cylindrical member of thin metal is sealed to a cylinder of glass and the metal is provided with a stiffening rib to prevent any distortion which takes place in the free end of the tube from being transmitted to the glass seal.

Another object of the invention is the provision of a grid structure which is held by a supporting member with which only a poor thermal contact is made.

Still another object of the invention is the provision of an electrode structure wherein an electrode has sealed thereto a glass bead which serves to hold the electrode in proper alignment with respect to surrounding parts when the electrode is inserted in the tube structure during assembly.

The above mentioned and further objects and advantages of my invention and the manner of attaining them will be more fully explained in the following description taken in conjunction with the accompanying drawing.

Figure 1:
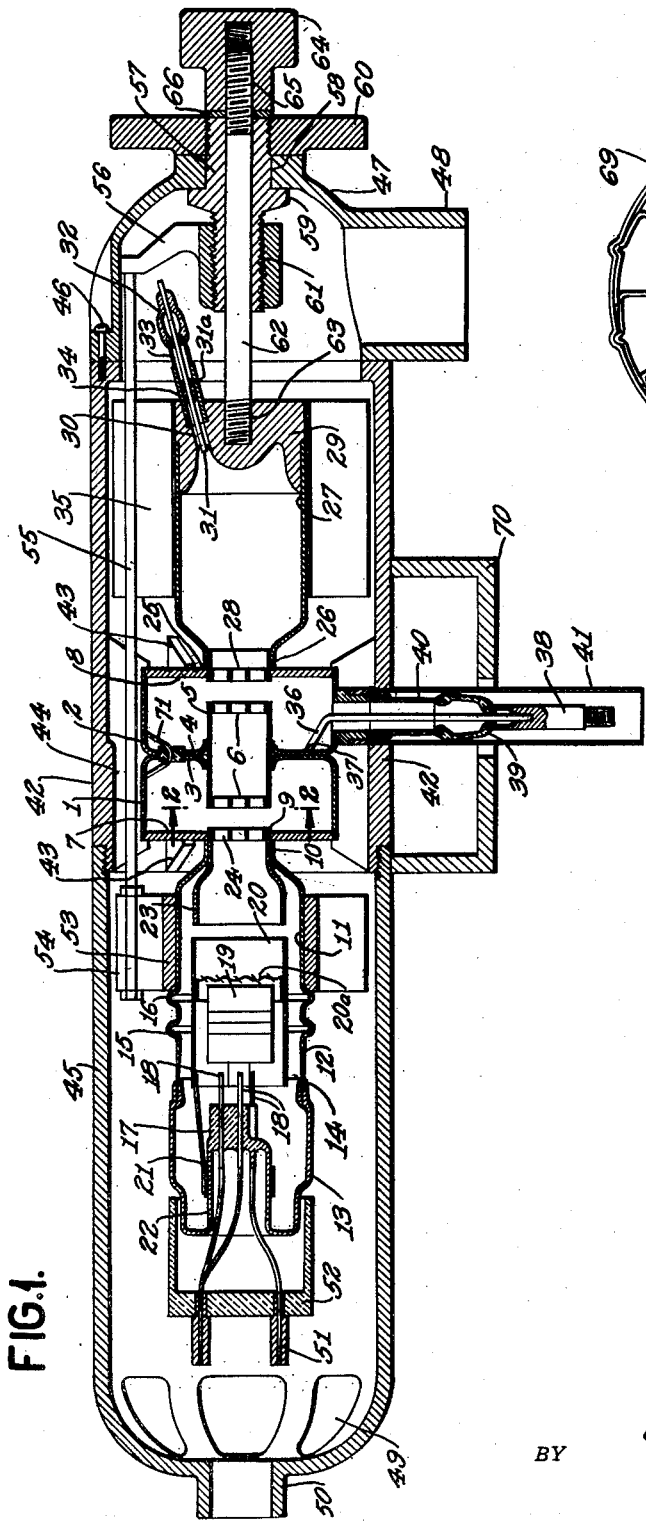
Figure 2:
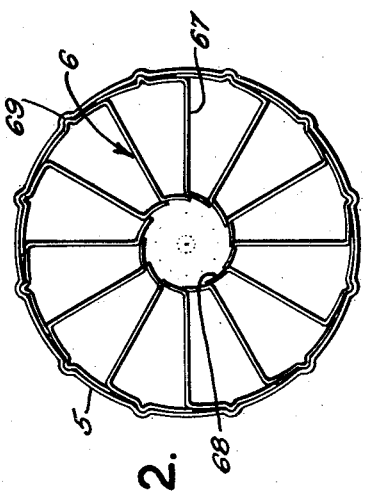

In the drawing Fig. 1 is a sectional side elevation view of a vacuum tube constructed in accordance with my invention. Fig. 2 is an end view on an enlarged scale of a grid of Fig. 1 taken along section line 2—2 of Fig. 1.

Referring more particularly to the drawing, reference numerals 1 and 2 indicate a pair of cup-shaped metal tubes the bottom portions 3 and 4 of which are joined together by brazing or any other suitable joining process which produces a vacuum tight joint. These bottom portions are apertured and serve to hold a drift tube 5 which is positioned in the aperture by a brazed joint or any other suitable means. A grid 6 of tantalum or similar refractory metal is positioned in each end of the tube 5. Affixed to the open end of the tube 1 is a flexible diaphragm 7 and to the open side of tube 2 a flexible diaphragm 8. The diaphragm 7 has a centrally disposed aperture 9 in which is positioned the end 10 of a metal tube 23 which is in turn surrounded by a metal tube 11 the other end 12 of which is sealed to a glass thimble 13 at 14. Two ribs 15 and 16 are provided in the metal tube 11. These are preferably rolled in the wall of the metal tube itself but might be separate rings attached to the outside or inside of the tube wall. The joints between the tube 1 and diaphragm 7 are vacuum tight preferably being made by brazing.

Attached to the thimble 13 is a press 17 through which extends leading-in conductors 18 which provide connections for the cathode structure 19 and likewise serve to support this cathode structure. Reference numeral 20 indicates a cylindrical controlling electrode which is supported by a clamp 21 encircling the reentrant stem 22 of the thimble 13 and is connected to one of the conductors 18. The electron concentrating tube 23 which is brazed or welded or otherwise attached to the inside of tubular member 10 has positioned therein a grid 24 which is similar to grid 6.

A grid 20A of tantalum wire mesh or other material forms part of the control electrode and serves to increase the control effect thereof.

Welded in central aperture 25 of the diaphragm 8 is a sleeve 26 to which is attached the reduced end portion of a second tube 27. Located inside of this sleeve 26 is a grid 28. The outer end of the tubular member 27 is closed by means of a target electrode 29 which is brazed or otherwise attached to the tube 27 in a vacuum tight fashion. The target has a hole 30 through which projects a wire electrode 31 the latter being attached by a vacuum tight seal 32 to a metal tube 33 which is in turn brazed to the target electrode 29 at 34. Surrounding the electrode 31 is a glass bead 31A which is sealed to the wire but not to the tube 33. This glass bead holds the electrode in its proper spaced position in the hole 30 during assembly of the discharge device and operation thereof. A plurality of cooling fins 35 are fixed to the outer portion of the cylindrical member 27.

The chambers formed by cups 1 and 2 constitute resonant circuits, these being joined by the element 5 which forms a drift tube. The resonant chamber or velocity modulator acts to modify the velocity of the electron stream from the cathode 19 so as to cause a bunching of the electrons and resonant chamber or extractor 2 acts as an output circuit for the device this extractor being energized by the bunches or groups of the electrons from the accelerator. A conductor 36 is connected to the inside of the resonant chamber 2 so as to form a small loop 37 for the extraction of oscillating current energy. This wire is attached to a terminal 38 which is joined by a vacuum tight glass seal 39 to a tube 40, which is in turn brazed to the side of cup 2 in vacuum tight manner. Reference numeral 41 indicates a protective sleeve which surrounds the seal 39 and protects it from injury, and may also serve as an outer conductor for a concentric line output coupling.

The unit consisting of resonant chambers 1 and 2 is held similarly within a housing ring 42 by means of clamping fingers 43 which are disposed at intervals around the inside of the housing ring. The housing ring is made in two parts which are joined together at 44 by means of screw threads or any other suitable connection. The fingers 43 engage only the peripheral edges of the cups 1 and 2 leaving the diaphragms 7 and 8 free for movement lengthwise of the longitudinal axis of the tube. This longitudinal movement permits the resonant chambers to be tuned to a desired operating frequency. An end cap 45 is screw threaded to one end of the housing ring 42, and the other end of the housing ring 42 is attached by screws 46 to an end cap 47. This end cap has an air inlet pipe 48 formed integrally therewith through which air may be forced so as to pass around the cooling fins 35 of the tube then around the resonant chambers 1 and 2 and out of openings 49 in the end cap 45. The end cap 45 also has a centrally disposed opening 50, through which leading-in wires may be passed to connect with the connector pins 51 of the lead-in conductors 18. The connector pins are held by the ceramic base 52 which is in turn sealed to the glass thimble 13.

In order to deflect the diaphragm 7 to adjust the tuning of the resonant chamber 1 a split ring 53 is clamped around the outside of the metal tube 11 and abuts against the rib 16. Any distortion of the tube 11 caused by the clamping ring 53 is prevented from transmission to the glass-metal seal 14 by means of the stiffening rib 15 which tends to resist distortion of the seal from its original shape. A plurality of fingers 54 are provided around the periphery of the clamping ring 53 to receive adjusting rods 55 the other ends of these rods being secured to a spider 56 which is screw-threaded to a sleeve 57 passing through an opening 58 in the end cap 47. The sleeve 57 has an integral collar 59 on the inside of the end cap 47 and a screw threaded adjusting nut 60 on the outside of the end cap, the arrangement being such that when the adjusting nut 60 is turned the sleeve 57 turns therewith and causes, through the intermediary of the screw connection 61, a movement of the spider 56 and a resulting flexing of the diaphragm 7. The screw thread 61 is of the righthand type so that when the knob 60 is turned in a clockwise direction the diaphragm 7 is moved in towards the center of the resonant chamber 1 and the grid supported by diaphragm 7 is caused to approach the adjacent grid 6. An adjusting shaft 62 passes through the central opening in the sleeve 57 and is firmly fixed to the target electrode 29 at 63. The outer end of the rod 62 is screw threaded to a nut 64 at 65 the thread being of the lefthand type whereby, when the knob 64 is turned in a clockwise direction, the diaphragm 8 is caused to move toward the inside of the resonant chamber 2 and move the grid 28 nearer to the adjacent grid 6. Reference numeral 66 indicates a washer.

It will be seen from a consideration of the preceding description that the tuning of the resnonant chamber 1 can be controlled by means of knob 60 and the tuning of resonant chamber 2 by the knob 64. Furthermore, the two chambers may be tuned independently of one another. However, once the two chambers have been brought into resonance with one another the entire tube can be adjusted to operate at a different wave length merely by clasping the two knobs and turning them together in a clockwise or counterclockwise direction. Because of the righthand thread 61 and the lefthand thread 65 the adjustment of the two resonant chambers is accomplished simultaneously in the same sense.

The grids 6, 24 and 28 are preferably of the construction shown in Fig. 2 but consisting of a plurality of radially disposed vanes 67 which are preferably of tantalum although tungsten or other suitable high melting point metal of low secondary emission characteristics may be used. Since these are placed edge on to the flow of electrons from the cathode 19 to the target electrode 29 they offer little mechanical obstruction to the electrons. Furthermore, since the vanes are relatively wide as shown in Fig. 1 they offer adequate radiant cooling surface to dispose of the heating caused by the operation of the tube. Furthermore the inner ends of the vanes are preferably joined by a metallic ring 68 which provides additional radial cooling surface for the inner ends of the vanes and thereby opposes any tendency for these ends to reach a deleteriously high temperature. In order to fix the grid 6 in position inside of the enclosing ring the metal of the periphery of the grid is pressed against the metal of the enclosing ring in such manner that projections are formed on the periphery of the grid. These projections fit into corresponding depressions in the enclosing ring, as indicated in reference numeral 69. This type of construction assures that the grid will be held in position sufficiently firmly from a mechanical viewpoint, and that at the same time the connection between the grid and the supporting ring will be of poor thermal conductivity. The poor thermal conductivity thereby secured is of importance in the manufacturing of the electrical discharge tube since during the exhausting operation the metal parts of the tube must be heated to high temperature in order to drive out the occluded and adsorbed gases. The heating of the grids for this purpose is most readily accomplished by operating the tube so that a stream of electrons from the cathode 19 impinge on the grids with sufficient volume and velocity to heat these grids to the necessary high temperature. If the joint between the grids and the supporting rings thereof were made of good thermal conductivity it would be extremely difficult to raise the grids to the necessary high temperature because the heat imparted to them would be quickly conducted away by the relatively heavy metal of the supporting rings and associated parts. However, by arranging the parts as described above the conduction of heat from the grids is reduced to such an extent that they may be readily raised to the desired exhausting temperature by the impinging stream of electrons. A sufficiently good electrical connection results since in addition to the galvanic connection obtained there is a very low capacity impedance between the parts at the very short wave length at which the device is adapted to operate, e. g., 10 meters.

The grid is desirably built up of Z shaped elements as shown in Figure 2, which elements are welded together at their inner ends to form the ring 68 and at the outer ends to form a similar ring.

A base member 70 is attached to the housing ring 42 for supporting the tube structure. Back coupling between the resonating chambers 1 and 2 is provided in any suitable way, for example by means of a wire 71 which forms a loop in both of the resonating chambers as shown in Fig. 1. When the tube is in operation but not oscillating a certain disposition of the electron stream impinging on the target electrode 29 results. But this disposition changes immediately when the tube starts to oscillate and as a result a different number of electrons impinges upon the electrode 31 when the tube is in oscillation, that is, different from the number impinging on the same electrode when the tube is not oscillating. Therefore whether or not the tube is in a state of oscillation can readily be determined by connecting a current measuring meter between the electrode 31 and the target electrode 29.

While I have described a particular embodiment of my invention for the purposes of illustration it should be understood that various modifications and adaptations thereof may be made within the spirit of the invention as set forth in the appended claims.

What I claim is:

1. An electron discharge tube comprising an evacuated envelope, enclosing means surrounding and protecting said envelope, said enclosing means including an enclosing ring surrounding a part of said envelope, clamping means attached to said ring and holding said envelope in a fixed position with respect to said ring, a pair of end caps attached to the two ends of said enclosing ring enclosing and protecting the remaining portions of said envelope and adjustable means carried by said enclosing means and connected to a part of said envelope for adjustably varying electric properties of said envelope.

2. A device in accordance with claim 1 wherein said adjustable means includes adjusting rods connected to portions of said envelope to produce a distortion thereof for tuning purposes and adjusting means is mounted on one of said end caps and connected with said rods for controlling the position thereof.

3. An electrical discharge tube of the velocity modulation type comprising an envelope having a velocity modulating chamber and an extraction chamber and including a housing enclosing said envelope, an end cap on said housing a pair of rotatably adjustable knobs mounted in said end cap side by side in coaxial alignment so that either knob may be adjusted separately or both knobs may be adjusted together, operating means connected with said envelope and adapted independently to distort walls of said resonant chambers to change the resonant frequency thereof, a connection from the operating means of one of said chambers to one of said knobs and a connection from the operating means of the other of said chambers to the other of said knobs.

4. An electrical discharge tube comprising an envelope having a velocity modulating chamber and an extracting chamber, each of said chambers having a flexible wall, said chambers being mounted side by side in coaxial alignment, a first means for flexing the flexible wall of said velocity modulating chamber, a second means for flexing the flexible wall of said extracting chamber, a housing enclosing said envelope and including an end cap on said housing, a pair of independently operable adjusting knobs mounted on said end cap, a righthanded screw thread connection from one of said knobs to said first means and a left handed screw threaded connection from the other of said knobs to said second means, whereby both of said chambers may be tuned to a different oscillating frequency without changing their relative tuning, by rotation of both of said knobs in the same direction.

5. An electrical discharge tube comprising a cylindrical metal envelope and a supporting ring surrounding said envelope, said supporting ring consisting of two cylindrical sections the first of which carries a plurality of fingers which engages with one end of said envelope, the second of which carries a plurality of fingers which engage with the other end of said envelope, both of said rings being joined together and forming a unitary structure firmly holding said envelope in a fixed position, and means for passing a blast of cooling fluid through said fingers.

6. A device in accordance with claim 5 wherein said envelope has a tubular extension, a protective cap being attached to said supporting ring, enclosing and protecting said projection.

7. An electrical discharge tube comprising an envelope having a velocity modulating chamber and an extracting chamber, said chambers being substantially integrally continuous on their inner surfaces, one of said chambers having an integral flexible wall, and means for exerting pressure on said flexible wall to cause displacement of said flexible wall to change the tuning of said resonant chamber, said means for exerting pressure including a tubular extension provided with a corrugated stiffening ring to prevent distortion of the end of said tubular extension remote from that which is connected to said flexible wall as a result of pressure applied to the end of said tubular extension remote from said flexible wall, and a glass closure sealed to the end of said tubular extension.

8. An electrical discharge tube comprising means for projecting a stream of electrons along a predetermined path, an annular support encircling a portion of said path and longitudinally disposed with respect to said path, and a grid mounted in the opening of said support, said grid comprising a plurality of strips of thin metal mounted edgewise to the direction of motion of the electrons along said path, said grid being secured to said ring merely by projections produced on said grid which engage with corresponding depressions in said annular support.

9. A grid for an electrical discharge tube comprising a plurality of generally Z shaped strips of thin metal mounted in overlapping relation and welded together forming a unitary body, comprising an outer ring formed by the tops of the Z's and an inner ring formed by the bottoms of the Z's, and a plurality of radial members formed by the intermediate portions of the Z's.

10. An electrical discharge tube comprising electron gun means for projecting a stream of electrons along a predetermined path generally longitudinally of said tube, a target electrode disposed generally transversely of said path for receiving said stream of electrons, and a detecting electrode passing through an opening in said target electrode at a position displaced with respect to the axis of symmetry of said target electrode.

11. An electrical discharge tube comprising a guiding sleeve and an electrode positioned in said sleeve, said electrode consisting of a wire having a glass bead sealed thereon intermediate the ends thereof, said glass bead positioning said electrode in said sleeve, said glass bead being free from attachment with said sleeve and said electrode being secured to said sleeve at a point remote from said glass bead by means of a metal to glass seal.

12. An evacuated electron discharge tube including an envelope, electron beam producing means, said envelope including a velocity modulating chamber and an extracting chamber, grid means connected to each said chamber and in the path of electrons produced by said electron beam producing means, said chambers being continuous throughout all their inner surfaces, whereby said inner surfaces may be airtight and thus define part of the evacuated envelope, each of said inner surfaces including an integral flexible wall portion, and means for exerting pressure on said flexible wall to cause displacement of said flexible wall to change the tuning of said resonant chamber.

13. An electrical discharge tube comprising electron producing and control means projecting a stream of electrons along a given path, a grid of low heat absorbing capacity in said path, a resonant circuit including a support for said grid, and a connection of low heat conductivity between said grid and said support.

CHARLES V. LITTON.

DISCLAIMER 2,309,966.—*Charles V. Litton, Redwood City, Calif.* VELOCITY MODULATED ELECTRICAL DISCHARGE TUBE. Patent dated Feb. 2, 1943. Disclaimer filed May 8, 1945, by the assignee, *International Standard Electric Corporation.*
Hereby enters this disclaimer to claim 12 of said patent.
[*Official Gazette June 12, 1945.*]